United States Patent [19]

Koller et al.

[11] Patent Number: 5,012,675
[45] Date of Patent: May 7, 1991

[54] INTEGRATING MULTIPLE MAPPABLE VARIABLES FOR OIL AND GAS EXPLORATION

[75] Inventors: Glenn R. Koller, Tulsa, Okla.; Matt F. Trout, Brookshire, Tex.

[73] Assignee: Amoco Corporation, Chicago, Ill.

[21] Appl. No.: 385,597

[22] Filed: Jul. 25, 1989

[51] Int. Cl.$^5$ .............................................. G01V 9/00
[52] U.S. Cl. ................................................... 73/432.1
[58] Field of Search ................. 73/432.1; 364/422, 420

[56] References Cited

U.S. PATENT DOCUMENTS

| 3,734,489 | 5/1973 | Milly | 73/432.1 |
| 4,646,240 | 2/1987 | Serra et al. | 364/422 |
| 4,648,268 | 3/1987 | Grosjean | 73/152 |
| 4,937,747 | 6/1990 | Koller . | |

FOREIGN PATENT DOCUMENTS 2117146 10/1983 United Kingdom .
2215891 9/1989 United Kingdom .

OTHER PUBLICATIONS

Busch, "Determination of Lithology from Well Logs by Statistical Analysis", SPE 14301, presented Sep. 22-25, 1985.
Baldwin and Morrow, "Identifying Subsurface Facies from User-Directed Computer Processing of Log and Other Data," Association Round Table, p. 462.
Anderberg, *Cluster Analysis for Applications*, Chapter 7, "Nonhierarchical Clustering Methods," (1973).
Davis, *Statistics and Data Analysis in Geoogy*, pp. 442-456, "Discriminant Functions".
SAS® *Users Guide: Statistics, Version V Edition*, Chapter 16, "The DISCRIM Procedure," and Chapter 18, The FASTCLUS Procedure, (1985).

*Primary Examiner*—Robert Raevis

[57] ABSTRACT

Data from multiple surveys of an area of the earth are integrated for use in oil and gas exploration and production. The data of each survey is first gridded and grid node values determined. A map index is assigned to each grid node and grid node values are associated with each map index to form a grid node suite. The set of grid node suites is processed to identify and determine covariant clusters of variables in multivariate space which includes various survey variables but which does not include location as a variable. Then, after determining to which of the clusters each grid node most probably contributes, a cluster identifier is associated with a respective grid node index for each grid node. Then a covariant cluster map of cluster identifiers as a function of grid node indexes is generated. Cluster locations on the map are correlated with other information about the area to assign earth features to the covariant cluster map. The map with assigned earth features is used in exploring for oil and gas and other subsurface mineral deposits.

16 Claims, 11 Drawing Sheets

| GRID NODE INDEX | GRAV. | MAG. | BATH. |
|---|---|---|---|
| 1 | 26 | 243 | 325 |
| 2 | 31 | 222 | 376 |
| 3 | 24 | 435 | 348 |
| 4 | 56 | 456 | 329 |
| 5 | 14 | 659 | 357 |
| 6 | 95 | 154 | 348 |
| 7 | 35 | 254 | 392 |
| 8 | 87 | 674 | 333 |
| 9 | 45 | 586 | 364 |
| 10 | 86 | 469 | 386 |
| 11 | 45 | 975 | 379 |
| 12 | 33 | 346 | 328 |
| 13 | 76 | 651 | 316 |
| 14 | 28 | 237 | 327 |
| 15 | 42 | 547 | 396 |
| . | . | . | . |
| . | . | . | . |
| . | . | . | . |

TO CLUSTERING PROCEDURES OF FIGURE 3

FROM CLUSTERING PROCEDURES OF FIGURE 3 →

| GRID NODE INDEX | CLUSTER INDEX |
|---|---|
| 1 | 2 |
| 2 | 2 |
| 3 | 2 |
| 4 | 1 |
| 5 | 1 |
| 6 | 1 |
| 7 | 1 |
| 8 | 1 |
| 9 | 1 |
| 10 | 1 |
| 11 | 3 |
| 12 | 3 |
| 13 | 2 |
| 14 | 2 |
| 15 | 2 |
| . | . |
| . | . |
| . | . |

Discriminant Function Classification
of Two Disjoint Clusters
Resulting in Two Misclassifications

INTEGRATING MULTIPLE MAPPABLE VARIABLES FOR OIL AND GAS EXPLORATION

FIELD OF THE INVENTION

The invention relates to using surveys of earth properties related to locations on the surface of the earth for locating subterranean features useful for oil and gas exploration.

SETTING OF THE INVENTION

Conventional oil and gas exploration uses seismic exploration and well logging data to interpret the earth's subsurface and to find and produce commercial accumulations of oil and gas. However, various surface survey data are available, or can be readily and inexpensively obtained for large areas, where sufficient seismic and well log data are not available or are prohibitively expensive.

These surveys include gravity, magnetic, bathymetric, electromagnetic (infrared, visible, spectrum, ultraviolet, x-ray, and the like), geochemical (ground water, remote sensing of hydrocarbons and the like) radioactivity, temperature, various radar, botanical, geological and other surveys.

These surveys frequently contain useful information to the oil and gas explorationist. The key is extraction of the useful information and its capture in useful form.

This invention deals with processing information contained in surveys which can be related to locations on the earth's surface to yield results which cannot be discerned from any single survey or from physical overlays or mathematical products or summations of more than one survey relative to two-dimensional space.

By applying the invented technique to surface survey data, an explorationist can predict, sometimes before drilling, which areas are most promising or where exploration will produce the most information at the least cost. This allows exploration of vast areas without the expense of extensive seismic data acquisition or drilling and logging. The types of potential fields, remote sensing and other survey data which can be processed according to the invention are inexpensive and easy to obtain compared to seismic and logging data. The processing time and computer usage requirements for the invention are also far less than what are needed for processing seismic and logging data.

SUMMARY OF THE INVENTION

Data from multiple surveys of an area of the earth are integrated for use in locating subterranean features useful for mineral exploration. A set of grid node suites is processed independently of map or grid node indexes to identify and determine covariant clusters of grid nodes in multivariate space which includes survey variables but which does not include location relative to earth's surface as a variable. In producing the grid node suites, the data of each survey are gridded and grid node values determined. A map index is assigned to each grid node and grid node values are associated with each map index to form a grid node suite. Following the step of determining covariant clusters and after determining to which of the clusters each grid node most probably contributes, a cluster index is associated with the map index for each grid node suite. Then a covariant cluster map showing cluster indexes as a function of map indexes is generated. Clusters on the map are correlated with other information available for the area being investigated to assign earth features, including subterranean earth features, to the covariant cluster map. The map with assigned earth features is used in exploring for oil and gas and other subsurface mineral deposits.

In a further aspect, the sets of survey data comprise one or more sets selected from topographic, bathymetric, gravity including free air gravity and Bouguer gravity, magnetic, electromagnetic, geochemical, radioactivity, temperature, biotic, geological and other surveys of the area; and an earth feature assigned to a particular cluster on the covariant cluster map is assigned to that cluster wherever it occurs on that or other maps.

As used herein, a set of clusters selected from more than one set of clusters by the procedure shown in FIG. 3 is referred to as "optimal clusters" or "a set of optimal clusters" and the like.

DETAILED DESCRIPTION OF THE INVENTION

Figure 1:
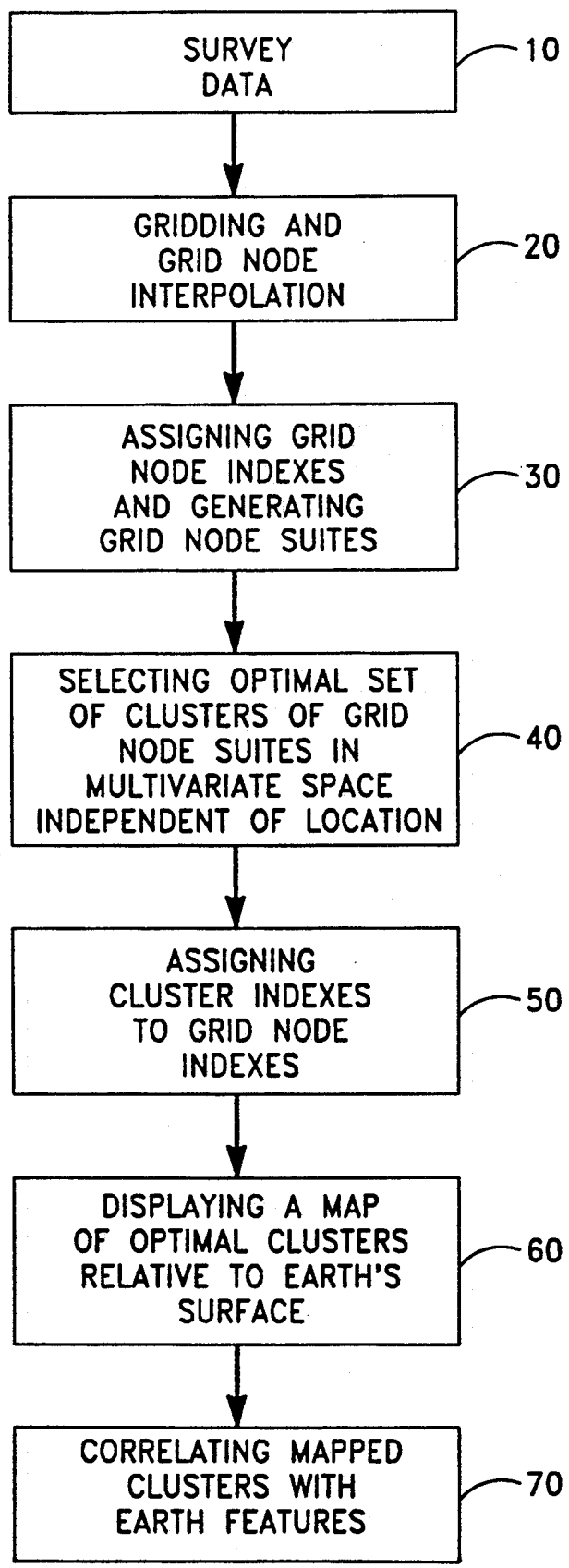
FIG. 1 illustrates the invention in the form of a simplified flow diagram.

The invented method produces maps of covariant clusters and assigned earth features relative to a map of the earth's surface from one or more, preferably two or more surveys of an area. Nonseismic, nonwell-logging survey data can be selected from topographic, bathymetric, gravity including free air and Bouguer gravity, magnetic, electromagnetic (infrared, visible, ultraviolet, x-ray and the like), geochemical, radioactivity, temperature, biotic, geological and other surveys. Seismic data and well logging data if sufficiently available over the survey area can also be used, for example, interval velocity data, porosity data, and the like, where sufficient values are available over the surface area. The data must be of a form which can be gridded and grid node interpolated as described below.

The object is to correlate variations in the various surveys as a function of location on the earth with subsurface characteristics or structure that can be used in exploring for oil and gas. Subsurface structure may cause, for example, bathymetric and gravimetric data to vary together in one region, where in another region covariance does not occur or is masked. The goal is to find those regions where covariance among various survey variables exists and can be defined. Then, if one or more subsurface structures can be determined for an area to correspond to one or more of these regions of defined covariance, the same interpretation can be used when the covariant clusters are observed in other areas.

Maps of covariant clusters (i.e., regions of defined covariance) can be produced from available surface survey data, correlated with existing or obtained logging or seismic data to determine subsurface structure corresponding to one or more of the regions of covariance, and used to explore for oil and gas. These maps of subsurface structure superficially resemble contour maps in some instances, but they represent a display relative to a survey area of regions of defined covariance in multivariate space among two or more survey variables.

This approach can be used for 1, 2, 3, 4 or more survey variables; preferably two or more. The approach works because subsurface structure has characteristics which tend to make the surface surveys separate into definable clusters in multivariate space which are characterized by greater similarity of covariance inside a cluster than outside a cluster or between clusters.

The keys are selection of the best multivariate space to permit resolution of a cluster, selection of the best number of clusters in that space, and selection of the best dataset for analysis in that space.

To illustrate, in a given multivariate space, a set of surveys may be resolvable into two clusters. When these are compared with known information about subsurface structure, it may be determined that one cluster corresponds to minimal residual bathymetric values and another cluster corresponds to "All Other" features. The given multivariate space is a good space in which to identify residual bathymetric minima. However, it may also be a good space for further resolving the "All Other" cluster of observations if the right variables or the right dataset is selected. This happens because the resolution of one highly defined cluster such as the residual bathymetric minima creates a circumstance where the "All Other" cluster cannot be resolved in its presence. This is a result of using statistical procedures to resolve the clusters which proceed by looking for similarities. If one cluster is highly defined, and two clusters produce the "best fit," then further resolutions may be obtained by eliminating from the data the grid node suites having indexes assigned to the "Residual Bathymetric Minima" cluster and evaluating whether the "All Other" group can be further resolved. See EXAMPLE II below.

Frequently, however, the multivariate space that best resolves one subsurface structure is not the same as the multivariate space that best resolves another subsurface structure. Just as real structures have real characteristics that permit resolution in the right multivariate space, different structures have different characteristics which may be best resolved in a different multivariate space.

The selection of the best multivariate space to resolve observations representing a subsurface structure into a cohesive group can be determined by trial and error, systematic trial of alternatives, or from experience using the invented procedure in similar areas to those where it has previously been used.

Referring now to the drawings, FIG. 1 at 10 illustrates that the invented procedure can begin with two or more surveys in a survey area on the earth's surface. Surveys suitable for use with the invention are sets of measurements where each measurement is or can be associated with an identified location in the survey area and where the set of survey data is capable of being gridded and grid node interpolated as described below.

Figure 2A:
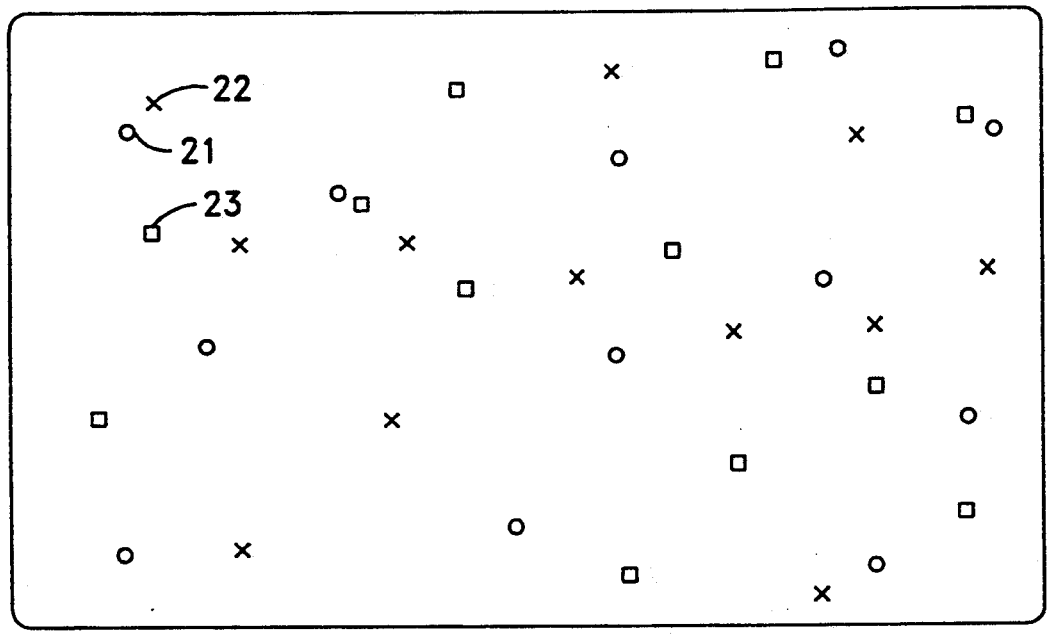
FIG. 2A illustrates locations of observations of three surveys in an area of the earth's surface.

Referring now to FIG. 2A, there is illustrated schematically three surveys having data points represented by symbols 21, 22, and 23, respectively. Data 21, 22 and 23 have respective locations in the survey area which might be expressed in earth or survey coordinates or in any convenient coordinate system which can be related to locations on the surface of the earth. Two or more surveys likely will not have measurements at the same locations. FIG. 2A may be considered to illustrate an area survey having gravity, magnetic, and bathymetric data collected at various locations. For processing, results of the two or more surveys must be referred to a common coordinate system or grid.

Referring again to FIG. 1, the gridding of the survey area and generation of values for each survey variable interpolated to grid nodes is illustrated at 20.

Figure 2B:
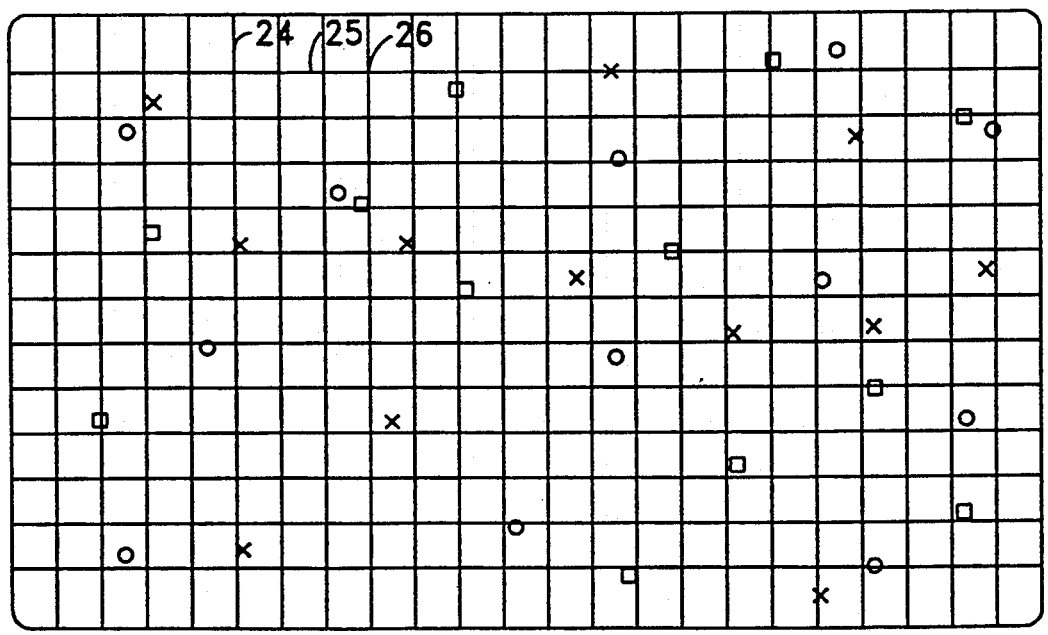
FIG. 2B illustrates gridding the survey area shown in FIG. 2A and interpolating values of each survey to each grid node.

A grid consists of spaced intersecting lines for locating points in a survey area relative to grid nodes formed by intersections of the lines. FIG. 2B illustrates survey data of FIG. 2A in reference to a grid formed by intersecting lines 24, 25 overlaying the survey area and intersecting at nodes 26. The step of grid node interpolating is one of generating for each grid node estimated values of each survey variable from adjacent distributed survey values.

Gridding sets of survey data and grid node interpolating the data to produce a set in which each grid node has associated values for each survey variable is used, for example, in generating contour maps from survey data. Various techniques of interpolating between measured values to estimate values at grid nodes can be used. These include moving least square, moving weighted average, and projected slope techniques. These techniques are well known and there is also available commercial software.

Figures 2C, 2D:
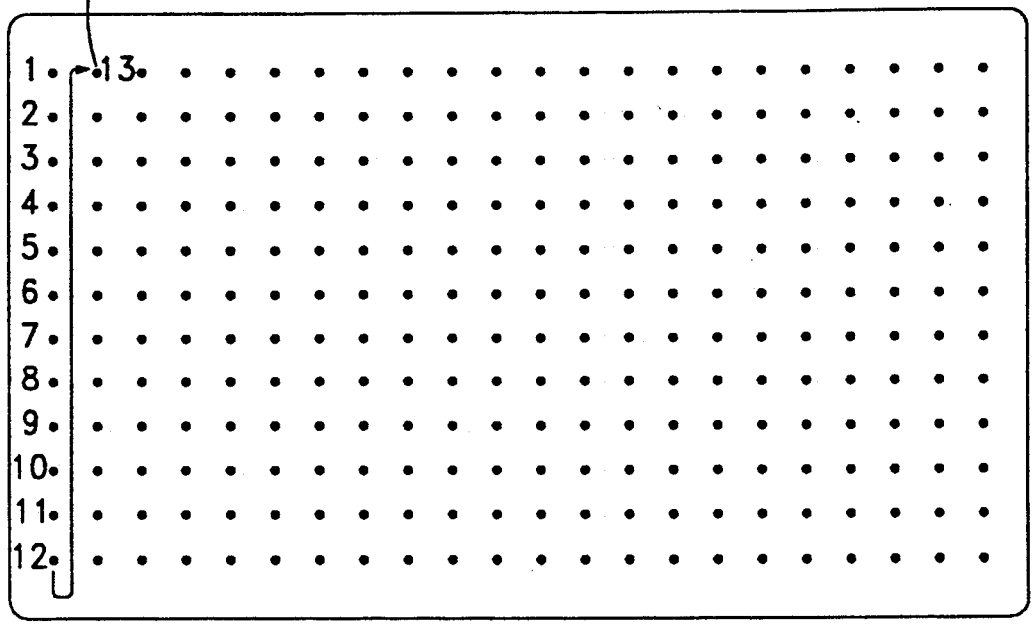
FIG. 2C illustrates assigning a map or grid node index to each grid node.
FIG. 2D illustrates a set of grid node suites, indexed by grid node indexes, in a form suitable for processing to identify and determine an optimal set of covariant clusters.

FIG. 2C illustrates each grid node as a point and illustrates that each grid node after grid node interpolation has associated with it a value for each of the surveys, for example, gravity, magnetic, and bathymetric surveys. See values illustrated at grid node 13. A set of survey values for a grid node is a grid node suite.

Referring now to FIG. 1 at 30, the step of assigning grid node indexes to each grid node and grid node suite is illustrated. Each index is capable of being related to a location on the earth's surface in the survey area. The terms "map index" or "grid node index" are used interchangeably.

In FIG. 2C, certain of the grid nodes are illustrated as having associated grid node indexes 1-13. Each grid node index can, by reference to the grid, be related to a location on the surface of the earth in the survey area. During processing of grid node suites to determine optimal clusters, these locations and grid node indexes are not used. In fact, after identifying and determining the optimal clusters, another step determines which grid nodes having respective indexes are most probably associated with each cluster. Then, the grid node indexes can be associated with particular clusters and used to produce a map locating optimal clusters on a map of the earth's surface.

As illustrated in FIG. 2C, assigning indexes to grid nodes and grid node suites can be done by sequentially and systematically numbering grid nodes in a survey area, for example, sequentially on a column-by-column basis. Other methods of assigning indexes can also be used, for example, (x,y) couples where (x,y) are (longitude,latitude) coordinates for respective grid nodes and the like. Assignment of indexes to grid nodes can readily be accomplished using a computer by skilled programmers.

Later, as described below, when cluster indexes are to be displayed as a function of areal location, the computer can also be used to associate a cluster index with each grid node index to indicate to which of the optimal clusters a grid node suite associated with each grid node index was most probably assigned.

The result as shown in FIG. 2D is a set of grid node suites for the selected surveys (illustrated by way of example as a suite of gravity, magnetic, and bathymetric values), each suite having an assigned grid node index. Each grid node suite has the form (a, b, . . . , n) or the equivalent where a, b, . . . , n are interpolated grid node values for the n surveys.

Referring now to FIG. 1 at 40, a set of grid node suites is then processed, independently of the location of the grid nodes relative to each other or to the surface of the earth to determine an optimal number of clusters in n dimensional space for the n selected surveys. This step of identifying and determining optimal clusters is discussed in detail in reference to FIG. 3.

It is essential that the clustering steps and evaluations of resulting clusters occur independently of locations of the grid nodes in the survey area. As mentioned above, real earth features have real characteristics which tend to make observations separate into clusters in multivariate space—clusters characterized by more similarity of covariance within a cluster than between clusters. But this separation in multivariate space only works effectively to give clusters of covariantly related properties in multivariate space when location is not one of the variables. In fact, the use of location as a variable in identifying optimal clusters in a multivariate space can result in two or more clusters whose values are closely related in the multivariate space appearing not to be closely related. Conversely, similarity of location can cause otherwise dissimilar observations falsely to appear to be related.

According to the invention, optimal clusters of grid nodes in a survey area are generated in multivariate space based on survey variables independently of location of grid nodes in the survey area. This differs from previous approaches to integrating multiple survey data. One approach has been separately to contour data of several surveys, and then to overlay two or more of the resulting contour maps and inspect for regions where two or more variables appear to be covariant. Another approach has been to integrate the values of different surveys into a single integrated value for each grid node using linear or nonlinear mathematical combinations of the interpolated survey values. The integrated values are displayed on a grid node by grid node basis and inspected for useful patterns.

These contouring and linear or nonlinear mathematical techniques are not generated in multivariate space independently of location, but include location information for carrying out the integration of survey values.

Referring now to FIG. 1 at 50, after an optimal set of clusters is identified in multivariate space independent of location, cluster indexes are assigned to the grid node indexes to indicate clusters to which respective grid nodes are most probably assigned. Determining the probability of assigning each grid node to the various clusters is described below in reference to FIG. 3.

Figures 2E, 2F:
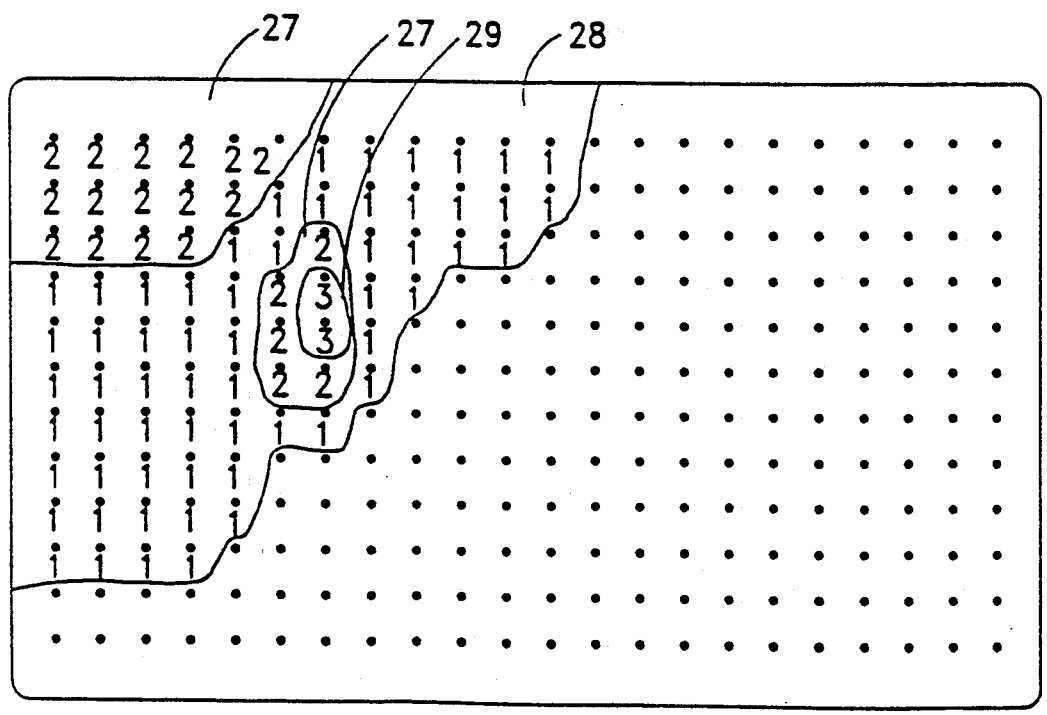
FIG. 2E illustrates a set of indexes, corresponding to those illustrated in FIGS. 2C and 2D, to which particular cluster indexes have been assigned.
FIG. 2F illustrates mapping cluster indexes as a function of grid node indexes to produce a covariant cluster map for the survey area represented by FIG. 2A.

In FIG. 2E, each grid node index has assigned to it a cluster index indicating to which of the set of optimal clusters the indexed grid node is most probably assigned.

Referring now to FIG. 1 at 60, the cluster indexes can be mapped to a representation of the area of the earth being mapped to produce a map showing the location of the clusters' assignments relative to a map of the earth's surface. Each grid index is colored or assigned other visual values to indicate to which cluster of the optimal set of clusters it belongs. Such a map is illustrated in FIG. 2F and also in EXAMPLE II and FIG. 8 below. Thus, FIG. 2F illustrates three covariant clusters having reference numerals 27, 28, and 29 respectively showing how optimal clusters 1, 2, and 3 are distributed relative to the earth's surface. The numbers 1, 2, 3 in this FIGURE refer to cluster assignments. Boundary lines 31 can be used to demarcate cluster assignments on the earth's surface.

IDENTIFYING OPTIMAL CLUSTERS OF SURVEY INDEPENDENTLY OF LOCATION

Figure 3:
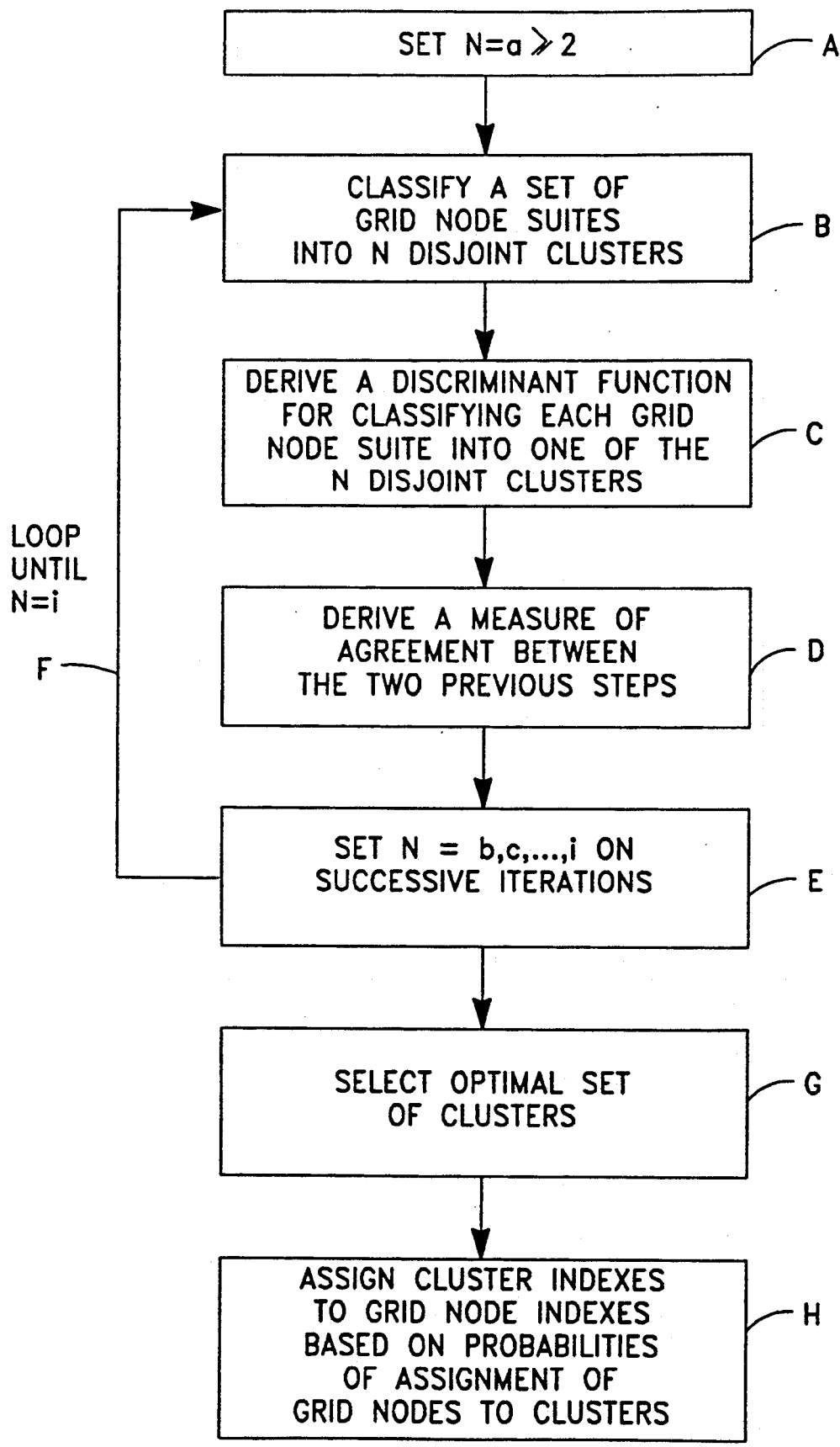
FIG. 3 illustrates a simplified flow diagram for selecting an optimal set of covariant clusters of grid nodes in multivariate space based on grid nodes suites, for evaluating probabilities that grid nodes contributed to each of the clusters, and for assigning an index for highest probability of assignment to a cluster to each grid node index and producing a covariant cluster map relative to the earth's surface.

Referring now to FIG. 3, a computerized data processor is used for determining optimal clusters in a set of survey data. Clusters are regions of defined covariance to which a set of grid node suites is assigned in a multivariate space whose variables include the different survey variables but do not include location as a variable. A set of optimal clusters is a set of clusters selected from more than one set of clusters on the basis that the optimal set best meets a selected criterion. A preferred procedure for generating and defining sets of clusters and for selecting an optimal set of clusters is described below.

A set of grid node suites can be entered into a data processor programmed to carry out the invented technique, or optionally survey data be entered and the computer can also be programmed to carry out generation of grid node suites. Referring to Steps A and B of FIG. 3, the grid nodes are classified in multivariate space by processing the grid node suites independently of location of the grid nodes into a selected number $N=a \geq 2$ of disjoint clusters producing a set of $N=a$ disjoint clusters of classified grid nodes. Then, referring to Step C of FIG. 3, operating on the resulting $N=a$ set of disjoint clusters, a discriminant function is generated which classifies each grid node based on its grid node suite into one of $N=a$ clusters of classified grid nodes. Referring to Step D of FIG 3, a measure representative of the extent to which grid nodes classified into $N=a$ clusters by the discriminant function corresponds to grid nodes in the $n=a$ disjoint clusters is generated. Referring to Step E and Loop F of FIG. 3, these three steps are then repeated for different sets of clusters, $n=b, n=c, \ldots$, producing a plurality of sets having respectively, $n=a, n=b, n=c, \ldots$, disjoint clusters of classified grid nodes. Respective discriminant functions and measures are also generated for each set of disjoint clusters. Then, referring to Step G of FIG. 3, based on and responsive to the measures, a set of the disjoint clusters (herein referred to as "optimal clusters") is selected as optimally representative of subpopulations of the set of grid nodes. As indicated, these steps are carried out in n-space where n is the number of surveys being processed and where the n-space does not include location as a variable.

Referring now in detail to FIG. 3, grid nodes are classified into a number $n=a \geq 2$ of disjoint clusters. This step is illustrated in FIG. 3 by reference letter B. This classification step results in a number $n=a$ of disjoint clusters.

Disjoint clustering means each grid node is classified into at most one of the clusters. The disjoint clustering technique is not a hierarchical clustering technique which would assign each grid node into more than one cluster. As a consequence, disjoint clustering requires specifying the number of clusters into which the grid nodes are to be classified. The initial specification of the number of clusters can be initialized by the user or by a default instruction in the program, as indicated by reference letter A in FIG. 3, and thereafter can be automatically incremented as illustrated by loop F.

The selection of the right number of clusters to best resolve subterranean structures can be handled on a systematic, iterative basis by picking a range of numbers of clusters, for example, 2-6, 3-7, and the like within which the number of resolvable clusters for the dataset being processed is expected to fall. In all tests so far, this number has been found to be in the range of 2-7. But there may be datasets where larger ranges or other numbers are useful.

The disjoint clustering technique used can be one of many such methods suitable for classifying each grid node based on its suite of values into a single one of n clusters. The technique is used to provide an initial cluster or group assignment for each grid node in the set being processed.

The generation of an initial cluster assignment for each grid node in the set being processed is a prerequisite to discriminant function analysis which requires that each grid node be assigned to no more than one cluster of a specified n clusters.

Disjoint clustering techniques are known per se. See, for example, Chapter 7 of "Nonhierarchical Clustering Methods," of *Cluster Analysis for Applications* (Anderberg, 1973). Statistical analysis programs and software suitable for practicing disjoint clustering techniques can be readily produced from the available literature and from principles herein described and are also available commercially in the form, for example, of the FASTCLUS procedure of SAS Institute, Inc., Cary, N.C., USA.

Referring again to FIG. 3, after classifying a set of grid node suites into n disjoint clusters by step B, a discriminant function is generated for each set of n clusters as illustrated by reference letter C of FIG. 3.

The step of discrimination is different from the step of disjoint cluster classification. Disjoint cluster classification is the process of assigning grid nodes into n groups or clusters that are both relatively homogeneous and distinct from other clusters. Discrimination is the process of finding the linear combination of variables which produces the maximum difference in multivariate space between existing clusters.

Discriminant function generating programs are known per se. See, for example, Davis, op. cit., pages 442-456. Further, statistical analysis software suitable for practicing the step of generating discriminant functions can be readily produced from the available literature and is also available commercially in the form, for example, of the DISCRIM software program of SAS ® Institute, Inc., Cary, N.C. USA.

Figure 4:
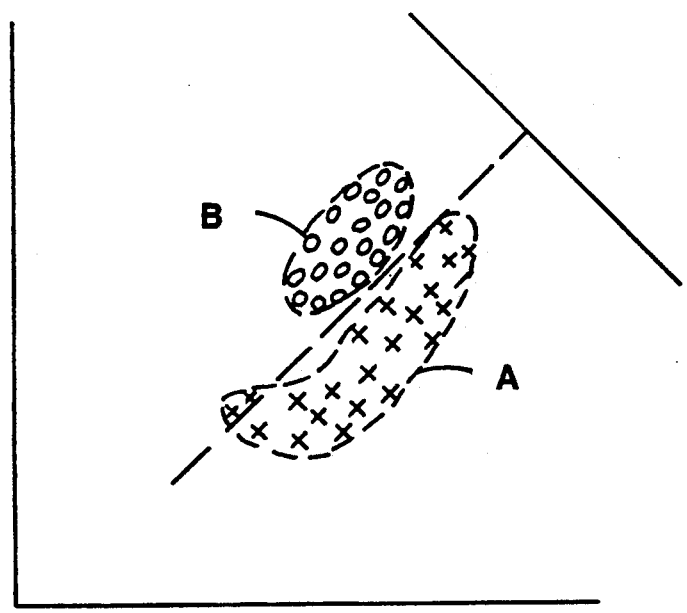
FIG. 4 illustrates in 2-space disjoint cluster analysis and discriminant function analysis applied to a population of data.

Referring now to FIG. 4, the following description illustrates standard techniques of discriminant function generation known to those skilled in statistical processing. Such a procedure is illustrated by FIG. 4. FIG. 4 illustrates two clusters A and B produced by disjoint cluster processing and further shows by a dashed line, a discriminant function effective for classifying grid node related suites into clusters A and B. As illustrated in FIG. 4, classification by the discriminant function results in 2 reclassifications since two of the grid nodes in cluster A are reassigned by the discriminant function to cluster B.

Discriminant function analysis consists of finding a transform which gives the minimum ratio of the difference between the multivariate means of the two clusters to the multivariate variance within the two clusters. Thus, referring to the two clusters of grid nodes in 2-space, illustrated in FIG. 4, discriminant function analysis searches for the one axis of orientation (indicated by the dashed line) along which the two clusters have the greatest separation while simultaneously each cluster has the least inflation. The coordinates of this axis of orientation, shown by the dashed line, are the linear discriminant function.

Two-space has been illustrated in FIG. 4 for simplicity; however, discriminant function analysis is effective generally in n-space.

As applied to processing a set of grid nodes represented by suites of values, discriminant function analysis will find a discriminant function for classifying grid nodes into the clusters in n-space generated by disjoint cluster analysis. If two types of surveys are grid interpolated producing two values for each node, the space is 2-space; if three types of surveys, the space is 3-space; and so forth.

The number of clusters and the dimensionality of space in which the clusters occur are not related. For example, there can be four clusters in 2-space or two clusters in 4-space, and in both cases the clusters may represent the optimally representative number of subpopulations existing in the respective variable space.

Referring again to FIG. 3, Step D a measure can be generated of the extent to which grid nodes classified into n disjoint clusters by disjoint cluster techniques (Step B of FIG. 3) correspond to grid nodes classified into n disjoint clusters by a discriminant function. The discriminant function is the one produced by operation of discriminant function analysis (Step C of FIG. 3) on the n disjoint clusters produced by disjoint cluster analysis. This step of generating a measure of agreement/disagreement between disjoint cluster analysis and discriminant function analysis is illustrated by reference letter D in FIG. 3 and, as described below, is used to select an optimal set of clusters. Such a procedure is illustrated by the foregoing discussion of FIG. 4, which illustrates that some members (2 members in the illustrated case of FIG. 4) of one disjoint cluster may be reclassified by the discriminant function into other of the disjoint clusters.

A suitable measure of agreement/disagreement can, therefore, consist of counting for each of n disjoint clusters generated by the disjoint cluster classification, how many reclassifications result when the grid nodes are reclassified using the discriminant function generated by operating on the n disjoint clusters. This is the simplest form of measure; however, any suitable measure of reclassification by the discriminant function can be used.

Where the number n of disjoint clusters produced by disjoint cluster analysis exceeds the number of clusters into which the discriminant function generated by discriminant function analysis is effective for classifying grid nodes, such a result will be apparent from the measure of reclassification. In effect, one or more of the n disjoint clusters will have no grid nodes assigned to it by the discriminant function when the n number of disjoint clusters is too large, (as determined by discriminant function analysis); and when n is too small, the number of reclassifications will be clearly greater than for a more optimal number n.

Procedures for generating measures of reclassification are known per se. Such procedures sometime form a part of commercially available discriminant function software (see, for example, Davis, op. cit., pages 442-456). Thus, statistical analysis software suitable for generating measures of reclassification by the generated discriminant function can be produced from the literature and is also available in the form of the DISCRIM Procedure of SAS ® Institute, Inc., Cary, N.C. USA. But by first performing disjoint cluster analysis and then discriminant function analysis for a series of different numbers n of clusters, the measure of reclassification can be used to evaluate how well the clusters produced by disjoint cluster analysis correspond to those produced by a corresponding discriminant function.

The foregoing discussion of the discriminant function generation and of the step of generating a measure of reclassification is illustrative of only two variables (surveys) of interest. In fact, one, two, three, four, or more variables may be of interest in the present invention, for example, the grid node related suites can comprise two, three, four or more selected surveys. In such cases, the discriminant function is effective for partitioning in multivariate space corresponding to the number of variables (surveys) of interest.

Referring again to FIG. 3, Step E and Loop F, the three steps discussed above (classifying grid nodes into n disjoint cluster (Step B of FIG. 3), generating discriminant function for classifying grid nodes into the n disjoint clusters (Step C of FIG. 3) and generating a measure of reclassification by the discriminant function Step D of FIG. 3) are repeated for n=a, n=b, n=c, . . . different numbers. The result is a series of sets of a, b, c, . . . disjoint clusters, respective discriminant functions for classifying grid nodes into the a, b, c, . . . disjoint clusters, and corresponding respective measures of reclassification for the discriminant function classifying grid nodes into a, b, c, . . . disjoint clusters. This repetition of steps is indicated in FIG. 3 by reference letter E and by loop F. This repetition of steps may be referred to as "iterative disjoint cluster analysis and discriminant function analysis" or "iterative DCA/DFA" EXAMPLE 1 below illustrates iterative DCA/DFA. Iterative DCA/DFA can readily be accomplished by a skilled programmer using commercially-available software which can be adapted for iteration as herein described.

The numbers a, b, c . . . which determine the number n of clusters into which disjoint cluster analysis will classify grid nodes are selected to encompass the number of clusters of grid nodes likely to exist in a given population. How many numbers a, b, c need to be investigated can be determined empirically either by using results of analysis in accordance with the invention or by previous experience or even by expectation of the user. At least two numbers, a, b, must be used to provide a basis for comparison of the measures of reclassification respectively generated. For many oil and gas exploration applications, a set of five numbers, for example, a=2, b=3, c=4, d=5, e=6, will suffice because most often the number of sets of significant subpopulations having a range of variability which can be distinguished by discriminant function analysis will be in this range of numbers. Conveniently, when using computerized data processing, the size of n can be set by the operator as illustrated by reference letter A in FIG. 3 and then the data processor can be programmed to iterate the steps B to E until a desired number of iterations have occurred.

The smallest measure of reclassified observations by comparison of disjoint cluster and discriminant function generated groups occurs at a smaller number n than the number n where discriminant function analysis indicates that fewer than n groups exist. Once these numbers n become such that the discriminant function fails to find as many clusters n as produced by the disjoint cluster classification step, then the discriminant function will also fail to define n clusters for larger values as well. These facts can be used to determine the representative or optimal number of clusters in a set of data.

The method has provided particularly advantageous results when used to process a set of grid node suites for locating subterranean features relative to the earth's surface.

An optimal set of clusters in a set of grid node suites is selected responsive to the measures of reclassification for the iterated number of clusters n=a, n=b, n=c . . . and their respective discriminant functions. See step 40 on FIG. 1 and step G on FIG. 3. By comparing the number of reclassifications for discriminant functions for each of n=a, n=b, n=c . . . disjoint clusters, the set of clusters n=K where K is a, b, c . . . is selected where the discriminant function has the smallest measure representative of reclassified grid nodes. If two numbers, n=b, n=c, have similar values of reclassification, K can be either b or c.

Referring again to FIG. 4, FIG. 4 can be used to illustrate the use of disjoint cluster classification and discriminant function analysis in combination for defining a set of disjoint clusters in a population. Thus, FIG. 4 shows that when disjoint cluster classification is used to create two disjoint clusters, the resulting discriminant function, illustrated by the dashed line, results in two reclassifications since the discriminant function assigns two of the grid nodes of cluster A to cluster B. Those skilled in multivariate analysis will appreciate that more than two groups cannot be properly represented in 2-dimensions, but that the technique works effectively for n dimensions.

The invention will be further understood and appreciated from the following Example:

EXAMPLE I—ITERATIVE DISJOINT CLUSTER ANALYSIS AND DISCRIMINANT FUNCTION ANALYSIS

A population of data is processed by performing disjoint cluster classification, discriminant function analysis, and generating measures of disagreements for n=2, 3, 4, 5, and 6 (i.e. Steps A-F of FIG. 3). The results are shown in Tables 1-6.

TABLE 1

| Disjoint Cluster | TWO SUBPOPULATIONS | | |
|---|---|---|---|
| | Classification by Discriminant Function | | |
| | 1 | 2 | Total |
| 1 | 90 | 1 | 91 |
| 2 | 0 | 9 | 9 |

Table 1 shows that the generated discriminant function reassigned one member of disjoint cluster no. 1 to cluster no. 2.

TABLE 2

| Disjoint Cluster | THREE SUBPOPULATIONS | | | |
|---|---|---|---|---|
| | Classification by Discriminant Function | | | |
| | 1 | 2 | 3 | Total |
| 1 | 9 | 0 | 0 | 9 |
| 2 | 0 | 3 | 0 | 3 |
| 3 | 0 | 0 | 88 | 88 |

Table 2 shows that the generated discriminant function for the three disjoint clusters produced no reclassifications.

TABLE 3

| Disjoint Cluster | FOUR SUBPOPULATIONS | | | | |
|---|---|---|---|---|---|
| | Classification by Discriminant Function | | | | |
| | 1 | 2 | 3 | 4 | Total |
| 1 | 2 | 0 | 0 | 0 | 2 |
| 2 | 0 | 88 | 0 | 1 | 89 |
| 3 | 0 | 0 | 3 | 0 | 3 |
| 4 | 0 | 0 | 0 | 6 | 6 |

Table 3 shows that the generated discriminant function reassigned one member of disjoint cluster no. 2 to cluster no. 4.

TABLE 4

| Disjoint Cluster | FIVE SUBPOPULATIONS | | | | | |
|---|---|---|---|---|---|---|
| | Classification by Discriminant Function | | | | | |
| | 1 | 2 | 3 | 4 | 5 | Total |
| 1 | 3 | 0 | 0 | 0 | 0 | 3 |
| 2 | 0 | 61 | 1 | 0 | 4 | 66 |
| 3 | 0 | 0 | 6 | 0 | 0 | 6 |
| 4 | 0 | 0 | 0 | 2 | 0 | 2 |
| 5 | 0 | 0 | 0 | 0 | 23 | 23 |

Table 4 shows that the generated discriminant function reassigned one member of cluster no. 2 to cluster no. 3 and reassigned four members of cluster no. 2 to cluster no. 5.

TABLE 5

| Disjoint Cluster | SIX SUBPOPULATIONS | | | | | | |
|---|---|---|---|---|---|---|---|
| | Classification by Discriminant Function | | | | | | |
| | 1 | 2 | 3 | 4 | 5 | 6 | Total |
| 1 | 6 | 0 | 0 | 0 | 0 | 0 | 6 |
| 2 | 0 | 0 | 0 | 0 | 0 | 1 | 1 |
| 3 | 1 | 0 | 49 | 2 | 0 | 0 | 0 |
| 4 | 0 | 0 | 0 | 17 | 0 | 0 | 0 |
| 5 | 0 | 0 | 3 | 0 | 19 | 0 | 0 |
| 6 | 0 | 0 | 0 | 0 | 0 | 2 | 2 |

Table 5 shows that the generated discriminant function reassigned one member of cluster no. 3 to cluster no. 1 and two members of cluster no. 3 to cluster no. 4. The function also reassigned three members of cluster no. 5 to cluster no. 3. Table 5 also shows that the generated discriminant function could not distinguish between cluster no. 2 and cluster no. 6 and, hence, assigned members of both cluster no. 2 and cluster no. 6 to one cluster (no. 6).

Figure 5:
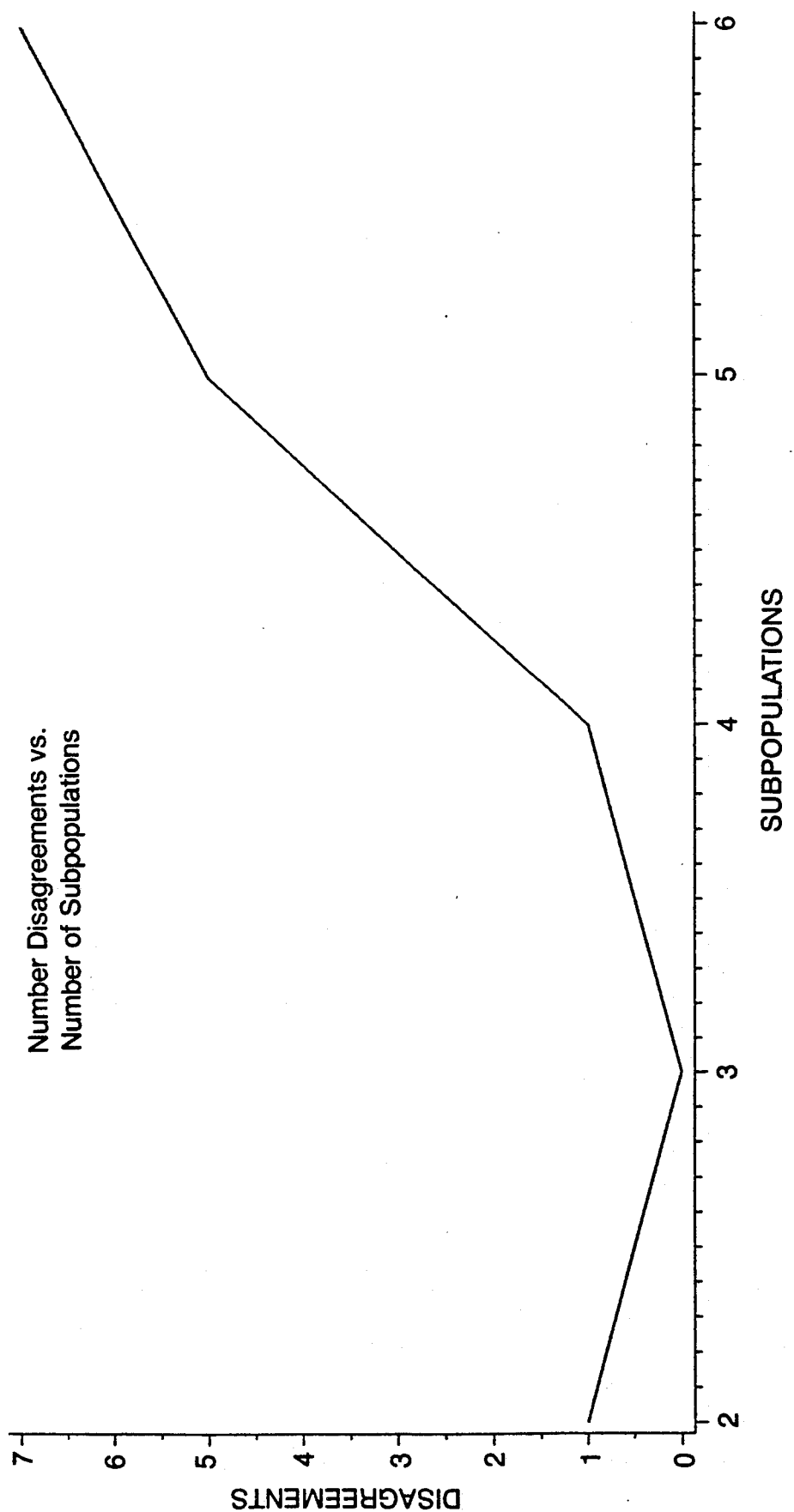
FIG. 5 illustrates the synergistic use of disjoint cluster analysis and discriminant function analysis for determining an optimal set of covariant clusters in multivariate space from a set of data.

The number of disagreements is plotted against the number of subpopulations in FIG. 5. The fewest disagreements (0 disagreements) occur at n=3. FIG. 5 represents the results obtained with a particular dataset. It is not necessarily the case that there will be zero disagreements as shown in this EXAMPLE when the results of disjoint cluster analysis and discriminant function analysis best agree. In every case, however best agreement is indicated for the set of n groups where the number of disagreements is least. Based on these results, it is determined that n=3 disjoint clusters produced by disjoint cluster analysis are representative of the population (Step G of FIG. 3).

Following (referring again to FIG. 3) selection of a particular set of clusters as optimally representative among the sets tried, each grid node index having an associated grid node suite can be assigned a cluster index which indicates into which cluster of the optimal set each grid node is most probably assigned. This feature is indicated as step H in FIG. 3 and as step 50 in FIG. 1.

A step in making this assignment is the generation of posterior probabilities to indicate what the probability is that a particular grid node contributes to a particular cluster of the optimal set.

In principle, the calculation of the posterior probability that a particular grid node is assigned to a particular cluster t is a measure of distance in multivariate space from the grid node to the centroid of cluster t divided by the sum of the distances from the grid node to the centroids of other clusters u. One suitable measure is, for example, $$p_t(s) = \frac{\exp(-0.5\, D_t^2(x))}{\Sigma_u (\exp(-0.5\, D_u^2(x)))}$$

where $p_t(x)$ is the posterior probability that observation x is assigned to cluster t, $D_t^2(x)$ is the generalized squared distance from x to cluster t, and $D_u^2(x)$ is the generalized squared distance to the other cluster u.

The calculation of posterior probabilities is known to those skilled in the art and need not be further described here. The calculation of posterior probabilities is also a function accomplished by commercially available discriminant analysis software such as the DISCRIM procedure available from SAS Institute, Inc., Cary, N.C.

Referring now to FIG. 1, according to a further feature of the invention, a map of locations of optimal clusters can be displayed relative to the earth's surface for the area being mapped. This step is indicated at 60 in FIG. 1.

Thus, once the posterior probabilities that each grid node was assigned to each cluster of the optimal set are determined, the grid node can be assigned to the cluster for which the probability is greatest. This can be done by associating a grid node index for that grid node with a cluster index for its highest probability cluster. The cluster indexes can then be indexed by grid node indexes. See step H of FIG. 3. See also FIG. 2E showing a set of cluster index assignments for a set of grid node indexes. Then such assignments can be displayed as a map of covariant clusters relative to the surface of the earth in the area being mapped. See step 60 of FIG. 1, FIG. 2F, and FIG. 8.

Optionally, following determining an optimal set of clusters of grid nodes in a set being processed, there can be eliminated or removed from the dataset for further processing grid nodes at grid node indexes associated with one or more clusters of the optimal set. Then, the step of determining optimal clusters independently of location can be repeated for the remaining set of grid nodes.

As applied to processing of grid nodes and related suites, this technique can be implemented as follows.

A set of grid nodes and related suites is selected which is expected to be representative of a particular variable of interest. Iterative DCA/DFA is used to determine an optimal number of clusters in the set. Then, for example, by correlation with other information, such as seismic data, cores, and the like, the clusters corresponding to one or more particular earth structures or features may be identified. The grid node indexes corresponding to the grid nodes in that cluster can be used to exclude suites at those grid nodes from a dataset for further processing. Alternatively, using the grid node indexes and cluster index assignments, a particular one or more of the optimal clusters of grid nodes can be selected for further processing.

The set of grid nodes minus the deleted cluster of grid nodes attributed to a particular earth feature or structure can be again processed using iterative DCA/DFA. The same surveys can be included in the set of grid node related suites being processed as before. Or, another set of surveys, for example, giving information about another earth structure or feature can be selected, and the resulting set of grid node related suites can be processed. These steps can be repeated as desired.

It will be apparent that 1, 2, or more clusters can be removed from consideration and that, therefore, the remaining set of subpopulations can include 1, 2, or more clusters. As applied to earth feature analysis, this means that after identifying a particular feature, the DCA/DFA method can be used to further subdivide that subpopulation or can be used to subdivide remaining sets of subpopulations after removal of the particular subpopulation.

According to an aspect of the invention, the population of grid nodes and related suites subjected to the steps of the invention can be constituted of grid nodes representative of particular features of interest, for example, subterranean canyons or fault systems, withdrawal basins, actively moving salt, sediment veneers on subsurface structures, and the like. Either grid node selection or grid node elimination can be used as discussed above to arrive at the set of grid nodes and related suites to be processed in accordance with the invention.

As indicated above, after using the invention to determine the optimal set of clusters, each grid node and its corresponding index in the initial set of grid nodes can be given a cluster assignment which identifies to which of the clusters the grid node at that index is most probably assigned.

Figure 8:
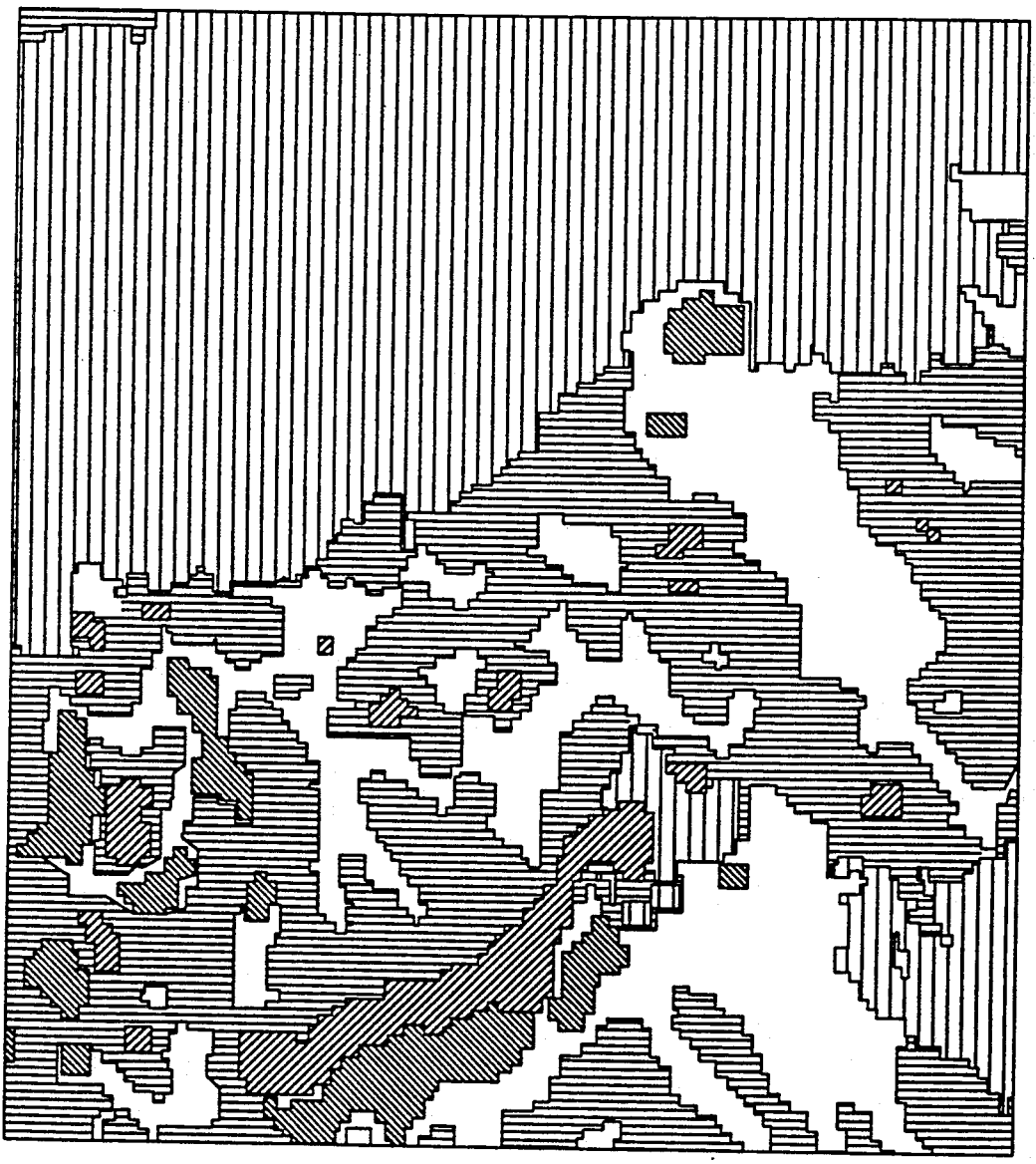
FIG. 8 illustrates a covariant cluster map, derived from bathymetric and free air gravity surveys of FIGS. 6 and 7 for the survey area.

Then, according to a further aspect of the invention, each cluster can be assigned a particular earth feature or structure. This assignment is performed after cluster processing. See FIG. 1 at 70. At this time, after the optimal clusters have been identified, the map showing location of clusters relative to the earth's surface can be inspected, compared with available core information or other available information concerning subterranean parameters in the area being mapped. Based on this comparison, structures or features can be assigned by the explorationist to the different clusters on the cluster map. A display can be generated showing the assigned structure or feature as a function of areal location. Such a display is also illustrated in FIG. 8 and discussed in EXAMPLE II.

After selection of an optimal set of clusters for one set of grid nodes (for one survey area), the discriminant functions for classifying grid nodes into that set of clusters can be saved and used for classifying grid nodes from other sets for other survey areas.

There are several advantages to this use of saved discriminant functions. First, it avoids the need for processing each population of survey data (i.e., each survey area) independently, which means that for further survey areas, the steps of determining what number of location subpopulations n=K is optimal can be avoided. Second, use of the retained discriminant functions assures that what is identified as a particular structure or feature in one survey area will be identified in the same way in all other survey areas. This facilitates following a particular structure or feature across a basin or reservoir.

Initial identification of a subterranean feature with a cluster requires seismic, well log, or other data. However, once the assignment is made, the saved discriminant functions can be used to map that feature across vast areas where such other information is not available.

The saved discriminant function, however, can identify only as many structures or features in the second set (second survey area) as it did in the first population (first survey area). There may be, in fact, more subpopulations in the second than in the first. For example, if there are three identifiable structures in a first survey area and the discriminant function is saved, this function will not identify a fourth structure which may exist in the second survey area. Rather, the fourth structure in second survey area may be misclassified as one of the structures of the first survey area or may be classified as "other" in the second area along with everything else the discriminant function could not classify.

Even if there are the same number of structures in two different areas, the discriminant function saved from the first area can only reliably identify the same structures in the second area as it did in the first. For example, the first might be underlain by actively moving salts, withdrawal basins, and subsurface canyons. The second might be underlain by a subterranean fault system but lack actively moving salts. Both areas contain the same number of features. However, the saved discriminant function from the first area will not correctly classify the subterranean fault system in the second area. This is because the saved discriminant function for the third feature for the first area was specifically formulated to identify the cluster representative of the intrusive salts in the first area.

To avoid these problems, a composite data set can be constructed. If the user is working in an area in which there are, for example, six features of interest but no individual survey contains all six features, a set of grid node related suites comprising data for all features can be composited to produce an initial population of data for generating and retaining discriminant functions. This, in effect, constructs a composite set of grid node suites which will contain all features of interest that might occur in any area in the region being evaluated. A saved discriminant function from the composited data can then be used to very quickly identify and determine all features in the entire area.

EXAMPLE II—SUBSURFACE STRUCTURE FROM SURVEY DATA

An area of interest for oil and gas exploration has only sparse seismic data available but bathymetric, free air gravity data, and total field magnetic survey data are available over the survey area. The area of interest is about 120×100 miles in dimensions. A part of the survey area lies between an area for which a seismic stratigraphic map is available, showing channels and canyons and another area for which a map is available also showing canyons and channels. It is desired to determine whether and where the two canyon systems intersect in the area of interest.

Figure 6:
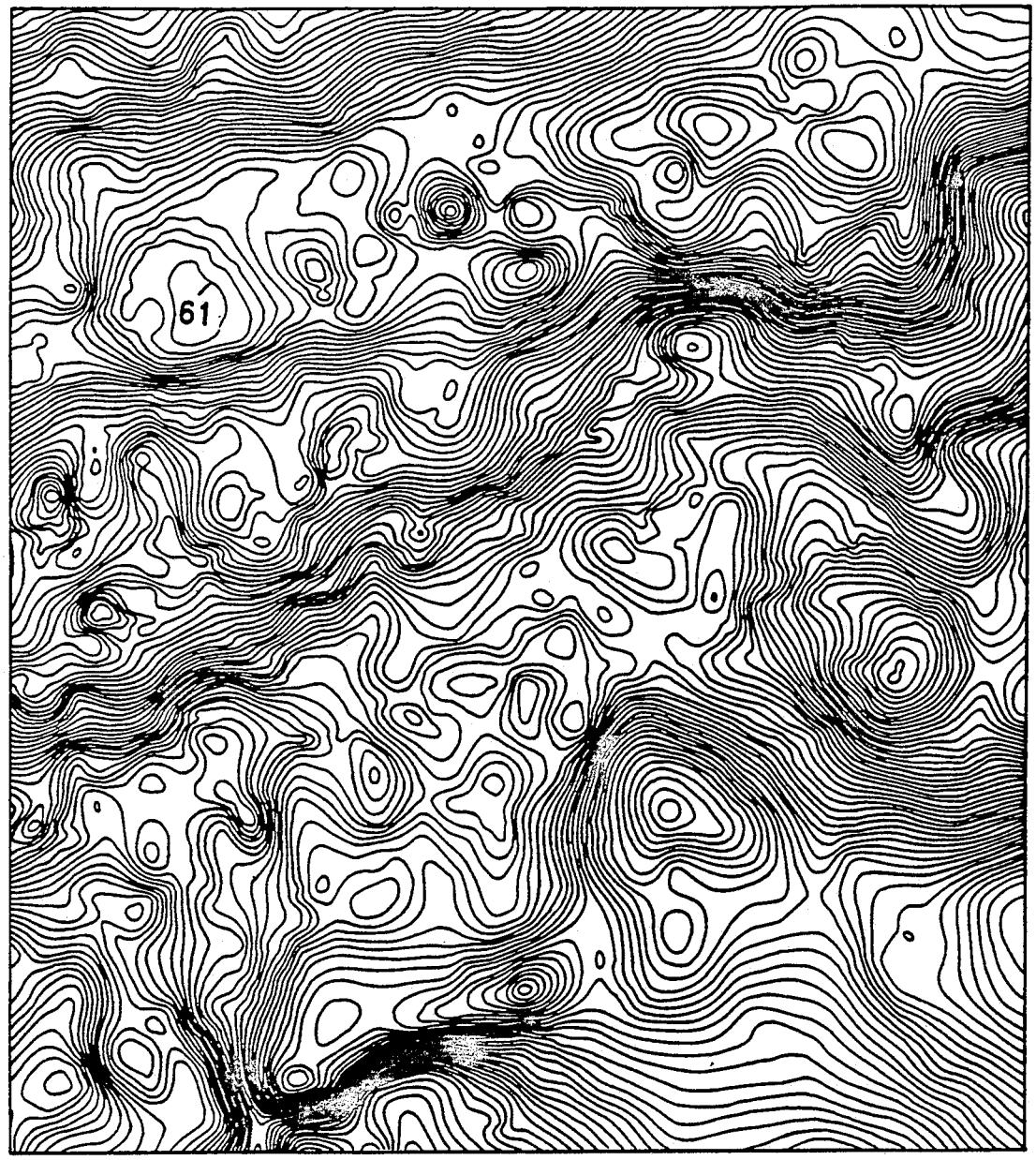
FIG. 6 illustrates contoured free air gravity data for a survey area.
Figure 7:
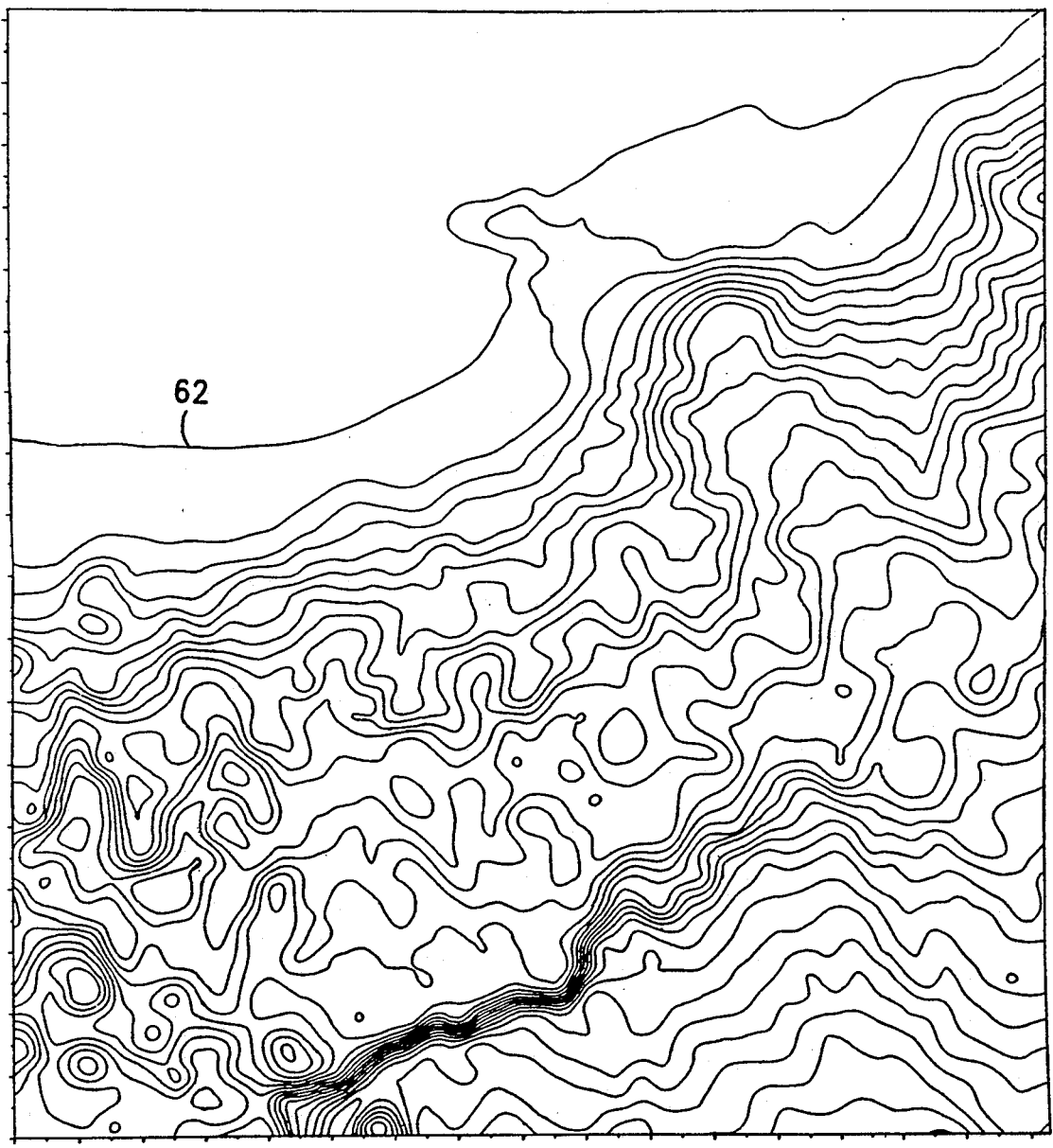
FIG. 7 illustrates contoured bathymetric data for the survey area shown in FIG. 6.

FIG. 6 illustrates contoured free gravity survey data for the survey area, illustrated by contour line 61. FIG. 7 illustrates contoured bathymetric survey data for the same survey area, illustrated by contour line 62. The bathymetric survey data are processed by generating a smooth bathymetric surface over the survey area, subtracting the smooth surface from the contour data to produce residual bathymetric data, and then contouring the residual bathymetric data at 20-ft intervals instead of 250-ft intervals illustrated in FIG. 6. This preprocessing of the bathymetric data permits resolution of subtle features during subsequent processing which are not as well resolved by use of the original bathymetric data.

The residual bathymetric data and free air gravity data are gridded, grid node interpolated, and grid node suites with associated grid node indexes produced. Using iterative DCA/DFA, it is determined two clusters are optimal. One of these clusters corresponds to residual bathymetric minima, i.e., residual bathymetric values about equal to zero, and the other cluster corresponds to "All Other."

The "All Other" cluster of data is again processed using iterative DCA/DFA. It is found that the cluster is best resolved into two further clusters. Each of these further clusters is in turn individually processed using iterative DCA/DCF and each is again found to be best resolved into two further clusters. The distribution of the five clusters thus identified are shown in FIG. 8.

The covariant cluster map of FIG. 8 is compared with available seismic data and other information about the area and the following cluster assignments are made:

| | |
|---|---|
| CLuster 1 | Residual Bathymetric Minima $\approx$ 0 |
| Cluster 2 | Channels |
| Cluster 3 | Actively Moving Salt |
| Cluster 4 | Active Withdrawal Basins |
| Cluster 5 | Sediment Veneer Over Salt Sills |

Other runs are made using other combinations of surveys for the survey area. By using seismic interval velocity values over the survey area, free air gravity and bathymetric surveys, differences not previously found are identified in the Active Withdrawal Basins. Also, by using total field magnetics and free air gravity surveys, it is possible to identify basin features more than 30,000 ft below salt sills inferred to exist in the area represented by Cluster 4 on the cluster map.

The covariant cluster map is juxtaposed with the two available maps showing channels and canyons. The combined resulting maps strongly indicate that the canyon systems of the two previously available maps were during geological history interconnected to each other via channels (Cluster No. 2) determined in accordance with the invention. The locations of the interconnecting canyons are determined relative to the surface of the earth using survey coordinates. The interconnecting canyon system can be specifically explored for commercial oil and gas without exploring the areas less likely to be successful.

This EXAMPLE indicates the great benefit from using the invention. Nonseismic survey data are used to identify subsurface structure, specifically buried canyon systems, where oil and gas accumulations are more likely than in closely adjacent areas.

Another advantage of the invention will be appreciated by comparing relative cost and manpower requirements.

For example, obtaining seismic data which can be used to identified buried canyon systems costs on the order of $800–1200 (1989 $) worldwide average per marine mile. Processing the seismic data for an area comparable to the survey area of EXAMPLE II using currently available state-of-art technology to reliably identify and locate buried canyon systems requires about 10 man-years and extensive computer usage.

By comparison, bathymetric and gravity data can be obtained typically for on the order of $10–$15/mile and processing in accordance with the invention for this EXAMPLE II required less than two weeks of time for one person and correspondingly little computer usage.

This Example also illustrates that the invention can be used in distinguishing diapirs from sills.

Diapirs are domes or anticlinal folds whose overlying rocks have been ruptured by squeezing-up of plastic core material which in sedimentary strata is usually salt, shale, or overpressured clay. Sills are tabular intrusions, e.g., of salt, usually paralleling the planar structure of surrounding rock. Diapirs and sills are frequently associated with oil and gas and moreover distinguishing diapirs from sills provides useful information to the explorationist. Referring to FIG. 8, Cluster 3 represents actively moving salt which is more likely to be associated with diapirs and Cluster 5 represents sediment veneers over salt sills. Hence, the invention facilitates distinguishing the locations of the regions characteristic of diapirs and the locations of the regions characterized by salt sills.

Figure 9:
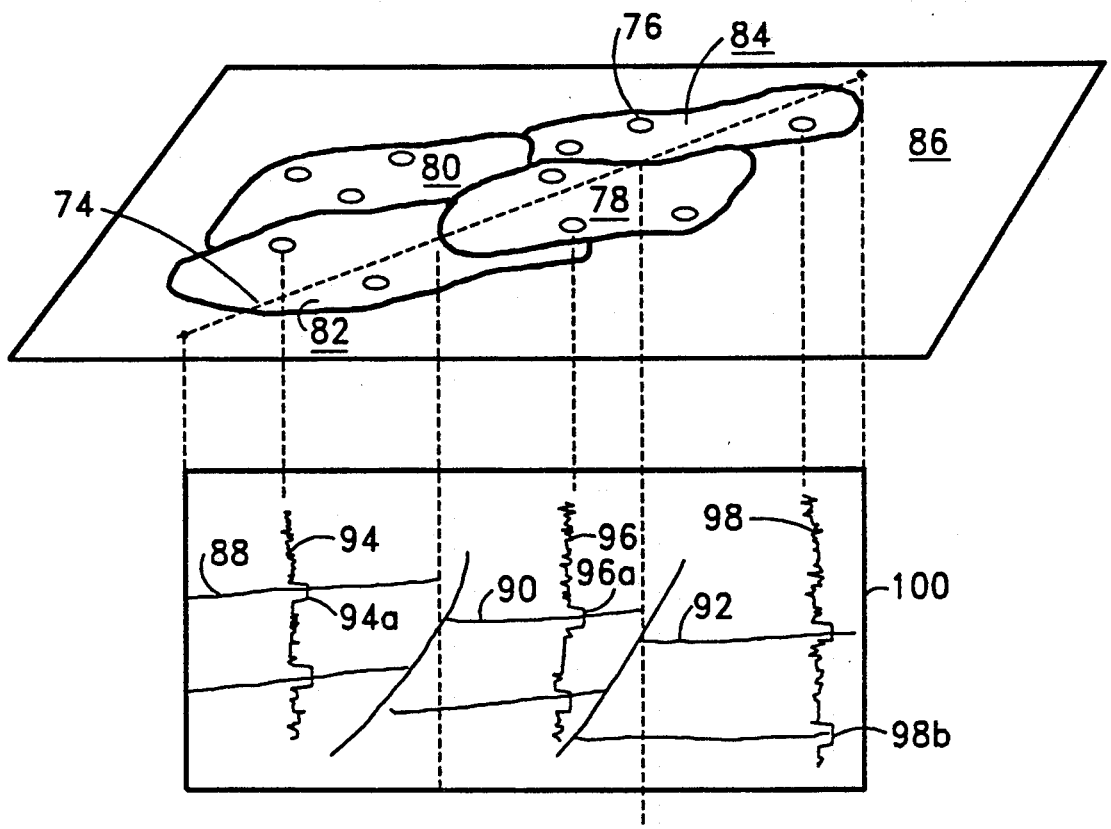
FIG. 9 illustrates using located and mapped clusters for determining correspondingly spatially distributed features in seismic sections and well logs for correlation with each other.

According to an aspect of the invention, spatial distribution of located and mapped clusters can be used for selecting subterranean features correspondingly spatially distributed. Thus referring to FIG. 9, clusters 78, 80, 82 and 84 are located and mapped in area 86 relative to the earth's surface. A seismic line of exploration 74 traverses clusters 82, 78, 84. Seismic section 100 is produced from resulting data and reflectors 88, 90, and 92 are illustrated. Wells illustrated by symbols 76 in area 86 have well log data available.

In accordance with this aspect of the invention, well log data are selected for wells 76 in cluster 82 for correlation with reflector 88, for wells 76 in cluster 78 for correlation with reflector 90, and wells 76 in cluster 84 for reflector 92 since such wells and reflectors have a spatial distribution corresponding to the respective clusters. Illustrative schematized logs 94, 96, 98 are displayed superimposed on section 100. Features 94a, 96a, and 98a on the logs are illustrated to coincide with reflectors 88, 90, and 92 respectively.

Note that selection of wells in Cluster 78, 80 and 84 to interpret reflector 88 would have resulted in difficulty in interpretation since features, for example, 96c, 98a, would not coincide with reflector 90. Hence selecting well logs having a spatial distribution corresponding to a located and mapped cluster and selecting features on seismic section 100 having a spatial distribution corresponding to the located and mapped cluster greatly facilitates interpretation between well log and seismic features. Correlation between seismic features and well log features means correspondence of the features in the subsurface; correlation between features generally means identifying features having a common geological character or location or both. Moreover, once the correlation between well logs and seismic features is made, the depth corresponding to the seismic feature can readily be determined from the well logs.

While this aspect of the invention has been described in terms of seismic sections and well log data, it will be apparent generally that mapping clusters to the earth's surface facilitates correlations generally between different data sets each of which can be mapped relative to such clusters on the earth's surface and which have corresponding spatial distributions to one or more of such clusters.

The invention requires little professional time and computer usage and produces at low cost maps showing locations of subsurface structures relative to the earth's surface. The invention and its benefits are believed heretofore unavailable to the oil and gas industry.

What is claimed is:

1. A method of exploring for one of oil, gas and other minerals comprising the steps of:
    (a) locating relative to the earth's surface subterranean features useful in exploring for one of oil, gas and other minerals, the locating step comprising:
    obtaining a set of grid node suites representing grid nodes for an area on the earth's surface in reference to which subterranean features are to be mapped, the set of grid node suites comprising a suite of survey values for each grid node;
    assigning grid nodes into clusters based on grid node suites independently of location of grid nodes relative to the surface of the earth;
    locating and mapping clusters relative to the surface of the earth;
    assigning at least one cluster of subterranean feature; and
    (b) further exploring for one of oil, gas and other minerals in an area on the earth specifically corresponding to at least one of the thus located and mapped clusters.

2. The method of claim 1 wherein step (b) comprises drilling in an area on the earth specifically corresponding to at least one of the thus located and mapped clusters.

3. The method of claim 1 wherein the step of assigning a subterranean feature comprises conducting one of well logging and seismic exploration in a region specifically corresponding to one of the located and mapped clusters; and
    determining subsurface structure corresponding to the region.

4. A method of exploring for one of oil, gas and other minerals comprising the steps of:
    (a) producing a map of location relative to the earth's surface of subterranean features useful in exploring for one of oil, gas and other minerals, the map producing step comprising:
    obtaining a set of grid node suites for an area on the earth's surface in reference to which subterranean features are to be mapped, the set of grid node suites comprising a suite of survey values for each grid node in a grid related to the area;
    determining clusters of grid node suites in space independently of location relative to the earth's surface, wherein each cluster comprises one or more grid node suites;
    determining to which cluster each grid node most probably contributes;
    assigning a cluster index to the corresponding grid node index for each grid node;
    displaying a surface area map of cluster indexes as a function of grid nodes for the area on the earth's surface; and
    (b) further exploring for one of oil, gas and other minerals in an area on the earth specifically corresponding to at least one of the thus located and mapped clusters.

5. The method of claim 4 wherein step (b) comprises drilling in an area on the earth specifically corresponding to at least one of the thus located and mapped clusters.

6. The method of claim 4 wherein step (b) comprises conducting one of well logging and seismic exploration in a region specifically corresponding to one of the located and mapped clusters; and
    determining subsurface structure corresponding to the region.

7. The method of claim 4 wherein the step of obtaining a set of grid node suites comprises:
    obtaining n surveys for the area,
    generating a grid with grid nodes for the area,
    generating grid node values for each grid node for each of the n surveys,
    assigning a grid node index to each grid node and associating grid node values for each grid node with a respective grid node index and forming indexed grid node suites;

8. The method of claim 4 wherein the step of determining clusters of earth properties in n-space comprises:

(a) classifying the grid node suites selected number $N=a\geq 2$ of disjoint clusters producing a set of $N=a$ disjoint cluster of classified suites;

(b) determining a discriminate function for classifying each suite in the set of grid node suites, into one of the $N=a$ disjoint clusters of classified data;

(c) generating a measure representative of the extent to which suites classified into $N=a$ disjoint clusters by the discriminant function corresponds to suites in the $N=a$ disjoint clusters;

(d) iterating steps (a), (b), and (c) for different number $N=b, N=c, \ldots, N=i$ of disjoint clusters producing a plurality of sets having respectively $N=a, N=b, N=c, \ldots, N=i$ of disjoint clusters of classified suites and producing respective discriminant functions and measures for each set of disjoint clusters;

(e) responsive to the measures selecting a set of disjoint clusters as representative of subpopulations in the set of grid node suites.

9. The method of claim 8
wherein the n sets comprise at least two sets selected from topographic, bathymetric, gravity, magnetic, electromagnetic, geochemical, radioactivity, temperature, biotic and geological surveys; and
wherein at least one of the clusters mapped as a function of location identifiers in the area of the earth to be mapped is assigned an earth feature type based on correlating location of clusters on the map with other information about the area; and
wherein the assigned earth feature type for a particular cluster is subsequently assigned to that cluster where ever it occurs.

10. The method of claim 9 further comprising:
producing the map of earth features in exploring for or producing oil, gas or other minerals from subsurface of the area; and
wherein at least one of the clusters mapped as a function of location identifiers is assigned a subsurface earth feature type for the area.

11. The method of claim 9 further comprising:
identifying buried canyon systems.

12. The method of claim 9 further comprising:
distinguishing areas more likely to be associated with sills from areas more likely to be associated with diapirs.

13. A method of exploring for one of oil, gas and other minerals by the steps of:

(a) correlating with one another subterranean features useful in exploring for one of oil, gas and other minerals, the subterranean features being spatially distributed relative to the earth's surface comprising:

obtaining a set of grid node suites representing grid node for an area on the earth's surface in reference to which subterranean features are to be mapped, the set of grid node suites comprising a suite of survey values for each grid node;

assigning grid nodes into clusters based on grid node suites independently of location of grid nodes relative to the surface of the earth;

locating and mapping clusters relative to the surface of the earth;

using spatial distribution of located and mapped clusters for selecting subterranean features correspondingly spatially distributed;

correlating correspondingly spatially distributed features with one another; and (b) further exploring for one of oil, gas and other minerals in an area on the earth specifically corresponding to at least one of the thus located and mapped correspondingly spatially distributed subterranean features.

14. The method of claim 13 comprising
locating a seismic feature on a seismic section having a spatial distribution corresponding to at least one of the located and mapped clusters;
locating a well log feature having spatial distribution corresponding to the at least one cluster; and
correlating the seismic feature and the well log feature.

15. The method of claim 13 wherein step (b) comprises drilling in an area on the earth specifically corresponding to at least one of the thus located and mapped correspondingly spatially distributed subterranean features.

16. The method of claim 13 wherein step (b) comprises conducting one of well logging and seismic exploration in a region specifically corresponding to at least one of the located and mapped correspondingly spatially distributed subterranean features.

* * * * *